No. 871,282. PATENTED NOV. 19, 1907.
R. G. KRUEGER.
SPRING DRAFT ATTACHMENT.
APPLICATION FILED JUNE 26, 1907.
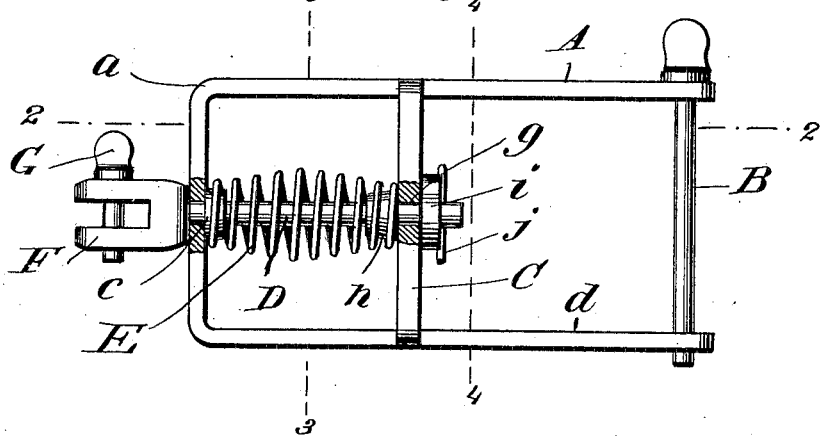
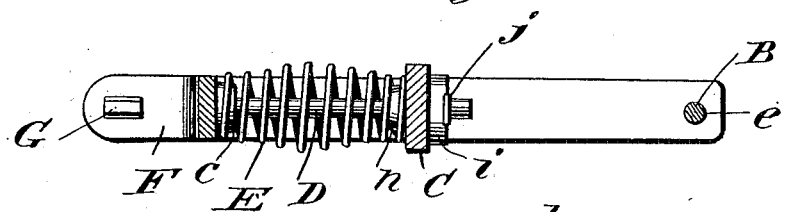
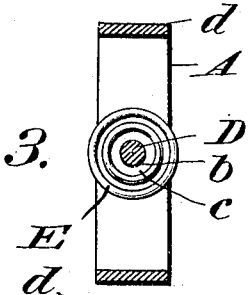
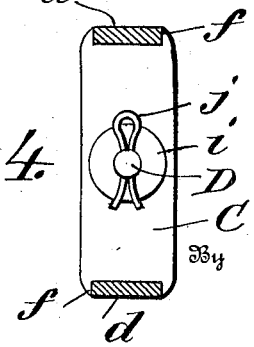
Witnesses
Phil C. Barnes
J. J. Sheehy Jr.
Inventor
R. G. Krueger
By James J. Sheehy
Attorney
THE NORRIS PETERS CO., WASHINGTON, D. C.

UNITED STATES PATENT OFFICE.

RICHARD G. KRUEGER, OF CRESCO, IOWA.

SPRING DRAFT ATTACHMENT.

No. 871,282.　　　　Specification of Letters Patent.　　　　Patented Nov. 19, 1907.

Application filed June 26, 1907. Serial No. 380,900.

*To all whom it may concern:*

Be it known that I, RICHARD G. KRUEGER, citizen of the United States, residing at Cresco, in the county of Howard and State of Iowa, have invented new and useful Improvements in Spring Draft Attachments, of which the following is a specification.

My invention relates to spring draft attachments for use in connection with plows, vehicles and the like; and it consists in the peculiar and advantageous construction hereinafter described and particularly defined in the claim appended.

In the drawings accompanying and forming part of this specification: Figure 1 is a side elevation of my novel spring draft attachment. Fig. 2 is a longitudinal section of the attachment, taken in the plane indicated by the line 2—2 of Fig. 1. Fig. 3 is a cross-section taken in the plane indicated by the line 3—3 of Fig. 1, looking toward the left. Fig. 4 is a cross-section taken on the line 4—4 of Fig. 1, looking toward the left.

Similar letters designate corresponding parts in all of the views of the drawings, referring to which: A is the body of my novel attachment, which is cast or otherwise formed of one piece of iron or other suitable metal. The said body is of U-shape, and is provided in its cross-bar $a$ with a longitudinal-central aperture $b$, and on the inner side of said cross-bar, around the aperture $b$, with a collar $c$, Fig. 2. It is also provided adjacent to the free ends of its longitudinal bars $d$ with alined apertures $e$ to receive a removable, headed pin B.

C is a cross-head movable toward and from the cross-bar $a$ of body A.

D is a draft bar, and E is a coiled spring surrounding the draft bar and interposed between the body bar $a$ and cross-head C. The cross-head C has recesses $f$ in its ends to receive the longitudinal bars $d$ of the body A, whereby it is guided on and held to said body; and it also has a longitudinal-central aperture $g$, and a collar $h$ arranged on its side adjacent to the body bar $a$ and surrounding said aperture $g$. The draft bar D is circular in cross-section to enable it to turn on its axis in the apertures $b$ and $g$, for an important purpose presently set forth; and it is equipped in rear of the cross-head C with a washer $i$ and a collar pin $j$ or other suitable device for retaining the washer in position. At its forward end the said draft bar D is provided with a bifurcated head F in opposite apertures of which is arranged a removable pin G. The coiled spring E is arranged as shown—that is to say, with its end coils around the collars $c$ and $h$, and consequently it will be seen that there is no liability of the spring engaging and interfering with either endwise or rocking movements of the draft bar D.

By virtue of the construction of my novel draft attachment, it will be observed that the pin G may be arranged horizontally and the pin B vertically or both pins G and B may be arranged vertically. From this it follows that the pin G may be engaged with a vertical clevis of a plow and the pin B employed to pivotally connect a doubletree to the body A of the attachment, or else the pin B may be used to pivotally connect the attachment to a doubletree, and the pin G to pivotally attach a swingle-tree to the attachment. In either arrangement of the attachment, the spring will be compressed when the body A or the draft bar D is subjected to pull, and in that way will preclude the imposition of shock and strain on the device to which the attachment is connected, and, at the same time, will be easy on the draft animals.

In addition to the before mentioned practical advantages, it will be noted that my novel draft attachment is very simple and inexpensive and is well adapted to withstand the rough usage to which devices of this kind are ordinarily subjected.

Having described my invention, what I claim and desire to secure by Letters-Patent, is:

The herein described spring draft attachment comprising a U-shaped body having a longitudinal-central aperture in its cross-bar, and a circular collar surrounding said aperture at the inner side of the cross-bar and also having alined apertures in its longitudinal bars adjacent to the free ends thereof, a pin removably arranged in the latter apertures of the body, a cross-head having recesses in its ends receiving the longitudinal bars of the body and also having a longitudinal-central aperture, and a circular collar on its side adjacent to the cross-bar of the body, surrounding said aperture, a draft bar, of circular form in cross-section, arranged to be moved endwise and turned on its axis in the apertures in the cross-bar and cross-head and having a bifurcated and apertured head at its outer end, a pin removably arranged in said apertures of the head, a collar secured on the draft bar at the inner side of the cross-head, and a coiled spring surrounding the draft bar and interposed between the cross-bar of the body and the cross-head and having its end coils loosely surrounding the circular collars on said cross-bar and cross-head.

In testimony whereof I have hereunto set my hand in presence of two subscribing witnesses.

RICHARD G. KRUEGER.

Witnesses:
RICHARD E. JONES,
MATTIE A. KRUEGER.